Feb. 2, 1926.

A. R. CLARK 1,571,395

APPARATUS AND METHOD FOR COLLECTING SEA WEED

Filed Nov. 6, 1924   2 Sheets-Sheet 1

Feb. 2, 1926.
A. R. CLARK
1,571,395
APPARATUS AND METHOD FOR COLLECTING SEA WEED
Filed Nov. 6, 1924   2 Sheets-Sheet 2
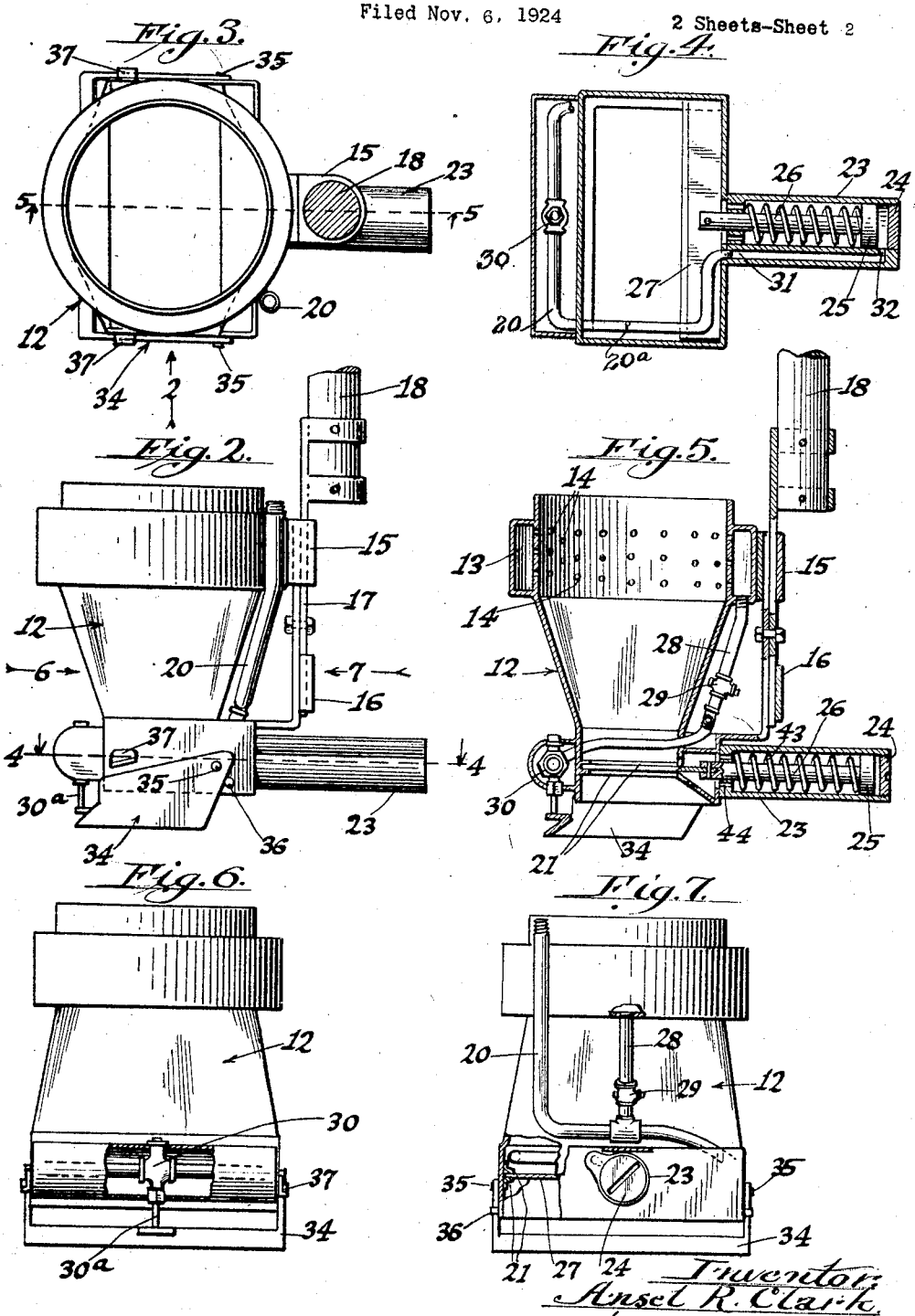

Patented Feb. 2, 1926.

1,571,395

UNITED STATES PATENT OFFICE.

ANSEL R. CLARK, OF LOS ANGELES, CALIFORNIA.

APPARATUS AND METHOD FOR COLLECTING SEAWEED.

Application filed November 6, 1924. Serial No. 748,112.

*To all whom it may concern:*

Be it known that I, ANSEL R. CLARK, a citizen of the United States, residing at Los Angeles, in the county of Los Angeles and State of California, have invented new and useful Improvements in Apparatus and Methods for Collecting Seaweed, of which the following is a specification.

This invention relates to an apparatus for collecting seaweed or similar submarine growths.

It is an object of this invention to provide an apparatus adapted to collect and temporarily retain together the seaweed or similar vegetation growing upon an ocean or other marine bottom, and to provide means for cutting off the vegetation and for elevating the cut-off vegetation to the surface. The device is especially adapted for collecting such seaweed as is used in the production of agar-agar, but may be used for other purposes as well.

Broadly, the apparatus consists of a flexible tube adapted to be lowered into the water and means is provided for creating an upward current within the tube, so that as the lower end of the tube is positioned over a bed of seaweed, the seaweed will be drawn into the tube. Further means is provided for cutting off the seaweed disposed within the tube, which permits the cut-off seaweed to be carried upwardly within the tube by the upward current therein and to be collected. It is especially advantageous to cut off the seaweed instead of pulling it up by its roots for the reason that the seaweed having been cut off will continue to grow, and harvests may be made over the same bed at regular intervals.

With the foregoing and other objects in view which will be made manifest in the following detailed description and pointed out in the appended claims, reference is had to the accompanying drawings for an illustrative embodiment of the invention, wherein:

Fig. 2 is an enlarged detail of the lower portion of the apparatus;

Fig. 3 is a top plan view of the device disclosed in Fig. 2;

Fig. 4 is a horizontal section taken substantially on the line 4—4 of Fig. 2;

Fig. 5 is a vertical section taken substantially on the line 5—5 of Fig. 3;

Fig. 6 is a view taken in the direction of the arrow 6 upon Fig. 2; and

Fig. 7 is a view taken substantially in the direction of the arrow 7 upon Fig. 2.

Figure 1:
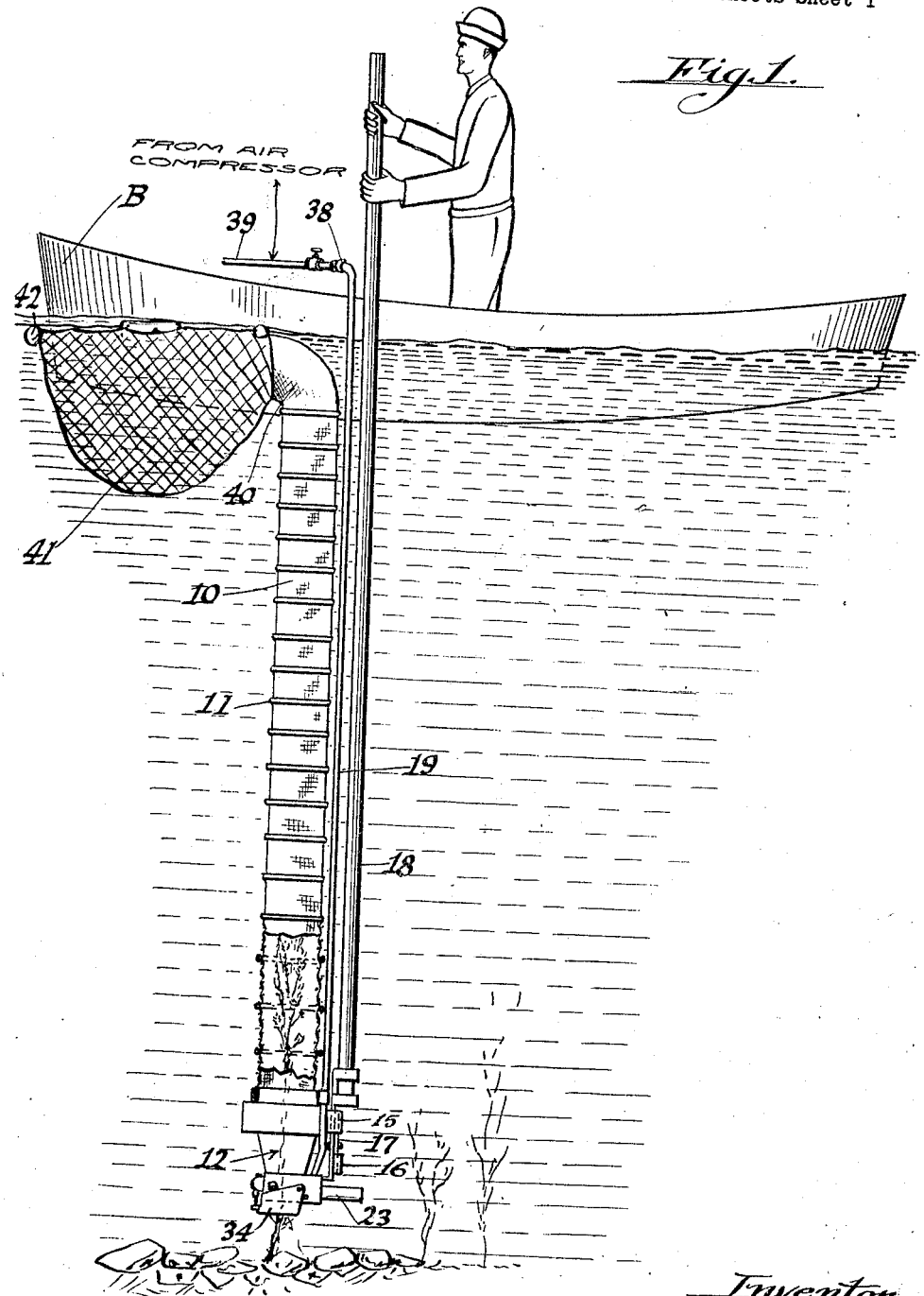
Figure 1 is a view showing the improved apparatus in applied position.

Referring to the accompanying drawings wherein similar reference characters designate similar parts throughout, the improved apparatus consists of a tube 10, which is preferably flexible and in the present instance is constructed of canvas or similar fabric, around which are placed a plurality of hoops 11 which may be formed of metal to hold the tube 10 in expanded position.

Upon the lower end of the tube 10 there is mounted a tubular member 12, preferably formed of metal. The tubular member 12 forms a continuation of the tube 10 and has an annular chamber 13 formed thereon. Apertures 14 are formed in the tubular member 12 and communicate with the chamber 13. Upon the side of the tubular member 12 there are mounted brackets 15 and 16 adapted to receive an arm 17 carried by a rod 18. An air pipe 19 extends downwardly alongside the tube 10 and is connected to the pipe section 20 carried by the tubular member 12. The lower end of the tubular member 12 is rectangular in form, as shown in Fig. 4, and suitable guide ribs 21 are formed therein.

Upon the rear side of the tubular member 12 there is mounted a cylinder 23 having its outer end closed by means of a threaded plug 24. Within the cylinder 23 there is disposed a piston 25 which is carried by a piston rod 26. The piston rod 26 has secured thereto a knife or blade 27, which upon movement of the piston 25 moves between the guide ribs 21 across the tubular member 12. The pipe section 20 which is connected to the air pipe 19 has connected thereto a second pipe section 28 which is provided with a suitable valve 29. The pipe section 28 leads to the annular chamber 13. The pipe section 20 is bent around the tubular member 12 and upon the forward side of the tubular member is provided a spring-actuated valve 30, which is normally held in closed position. As shown in Fig. 4, the pipe section 20 after passing through the valve 30 is bent around the tubular member 12 and is connected to a duct 31 or passage formed in the cylinder 23. This passage leads through a port 32 to within the cylinder. The pipe section 20 has a small aperture 20ª formed therein, as clearly shown in Fig. 4, for a purpose hereinafter more fully described.

A suitable trip device 34 is pivoted upon the sides of the lower end of the tubular member 12, as indicated at 35. Suitable stops 36 and 37 are mounted upon the sides of the tubular member 12 to limit the pivotal movement of the trip 34. The trip 34 is adapted to engage the stem 30ª provided upon the spring-actuated valve 30. The air pipe 19 has its upper end provided with a universal joint as indicated at 38, and is connected to a suitable pipe 39 which leads from a suitable air compressing device (not shown) disposed within the boat B. The upper end of the tube 10 is bent as indicated at 40 and is adapted to discharge into a net 41 supported by means of suitable floats 42 adjacent the boat.

The operation of the apparatus is as follows: Air is continually delivered through the pipe 39 to the air pipe 19 from which it passes into the pipe section 20. The valve 29 is adjusted so as to be partially open all the time and air can pass from the pipe section 20 through the second pipe section 28 into the annular chamber 13 and through the apertures 14 into the tube 10. The air being delivered into the tube 10 adjacent the bottom thereof bubbles upwardly through the tube and, in this manner acting similar to an air lift pump, produces an upward current of water within the tube 10. If the tube 10 is disposed over a bed of seaweed, the seaweed because of the upward current within the tube will be drawn therein. At various intervals the person operating the apparatus causes the tube 10 to be lowered by means of the rod 18 so that the trip 34 strikes the submarine floor. The trip 34 upon striking the bottom opens the spring-actuated valve 30 and permits air to pass through the pipe section 20 to the interior of the cylinder 23. This causes the piston 25 to be actuated and causes the blade 27 to move across the lower end of the tube 10 or across the tubular member 12, so that the blade 27 cuts off the seaweed disposed within the tube 10. The air continually flowing through the second pipe section 28 causes the continuous upward current of water within the tube 10 to carry the seaweed upwardly within the tube and to be discharged with the water into the net 41.

A suitable spring 43 is disposed about the piston rod 26 within the cylinder 23 and returns or retracts the piston 25 and the knife 27 carried thereby into their original positions when the trip 34 is disengaged from the submarine bottom. The aperture 20ª in the pipe section 20 permits the compressed air to escape from within the cylinder 23 and to be exhausted into the tube, thus permitting the spring to return the piston and knife into their initial positions. It will be understood that the aperture 20ª is fairly small, so that when the valve 30 is open, all of the compressed air supplied therethrough will not immediately pass through the aperture 20ª, but will actuate the piston. When the valve 30 is closed, the air slowly escapes from the cylinder through the aperture. Ports 44 may be provided which communicate with the interior of the tubular member 12 and with the interior of the cylinder 23 so as to permit free action of the piston 25 against the spring 43. When the net 41 has become filled with seaweed, it may be drawn into the boat B or be towed into port and the seaweed removed therefrom. The tube 10 is preferably flexible so that the lower end of the tube may be swung around by means of the rod 18 into various positions while the boat B is stationary or anchored.

It is seen that an apparatus is provided for collecting submarine growths or vegetation which consists of pneumatic means for causing an upward current within a tube which is adapted to be lowered into the water, and that pneumatic means is also provided for cutting off the vegetation disposed within the tube, the cut-off portions being allowed to be carried upwardly within the tube by the upward current of water therein.

It will be understood that various changes in the detail of construction may be made without departing from the spirit or scope of the invention as defined by the appended claims.

I claim:

1. An apparatus for collecting submarine growths comprising a tube adapted to be lowered into the water, means for causing water to flow upwardly within said tube thereby causing said growths to be drawn therein, and means for cutting off said growths within said tube.

2. An apparatus for collecting submarine vegetation comprising a flexible tube adapted to be lowered into the water, means for creating an upward current of water within said tube thereby drawing said vegetation into said tube, and means for cutting off the vegetation disposed within said tube adjacent the bottom thereof.

3. An apparatus for collecting submarine vegetation comprising a tube adapted to be lowered into the water, pneumatic means for causing upward current of water to be produced within said tube thereby drawing said vegetation therein, and means for cutting off the vegetation disposed within said tube.

4. An apparatus for collecting submarine vegetation comprising a tube adapted to be lowered into the water, means for causing said vegetation to be drawn into said tube, a reciprocable knife for cutting off the vegetation disposed within said tube, and means for reciprocating said knife.

5. An apparatus for collecting submarine vegetation comprising a tube adapted to be lowered into the water, pneumatic means for creating an upward current of water within said tube causing said vegetation to be drawn therein, and pneumatic means for cutting off the vegetation disposed within said tube.

6. An apparatus for collecting submarine vegetation comprising a tube adapted to be lowered into the water, means for discharging a fluid into said tube adjacent the bottom thereof so as to produce an upward current of water therein thereby causing said vegetation to be drawn into said tube, and means for cutting off the vegetation disposed within said tube.

7. An apparatus for collecting submarine vegetation comprising a tube adapted to be lowered into the water, a chamber formed about said tube adjacent the bottom thereof, there being apertures formed in said tube communicating with said chamber, means for forcing a gas through said chamber and apertures into said tube, thereby producing an upward current of water within said tube, and causing said vegetation to be drawn therein, and means for cutting off the vegetation disposed within said tube.

8. An apparatus for collecting submarine vegetation comprising a tube adapted to be lowered into the water, an air pipe associated with said tube, a cylinder carried by said tube, a piston within said cylinder, a knife carried by said piston, means for delivering air from said air pipe into said tube to produce an upward current of water therein and draw said vegetation into said tube, and means for delivering air from said air pipe into said cylinder to cause said piston and knife carried thereby to be operated to cut off said vegetation disposed within said tube.

9. An apparatus for collecting submarine vegetation comprising a tube adapted to be lowered into the water, an air pipe associated with said tube, a cylinder carried by said tube, a piston within said cylinder, a knife carried by said piston, means for delivering air from said air pipe into said tube to produce an upward current of water therein and draw said vegetation into said tube, means for delivering air from said air pipe into said cylinder to cause said piston and knife carried thereby to be operated to cut off said vegetation disposed within said tube, and spring means for retracting said piston and knife carried thereby into their initial positions.

10. An apparatus for collecting submarine vegetation comprising a tube adapted to be lowered into the water, an air pipe associated with said tube, a cylinder carried by said tube, a piston within said cylinder, a knife carried by said piston, means for delivering air from said air pipe into said tube to produce an upward current of water therein and draw said vegetation into said tube, and a trip mounted upon said tube adapted to actuate a valve upon contact with the submarine bottom to permit the delivery of air from said air pipe to said cylinder to cause said piston and knife carried thereby to be operated to cut off said vegetation disposed within said tube.

11. An apparatus for collecting submarine vegetation comprising a tube adapted to be lowered into the water, an air pipe associated with said tube, a cylinder carried by said tube, a piston within said cylinder, a knife carried by said piston, means for delivering air from said air pipe into said tube to produce an upward current of water therein and draw said vegetation into said tube, a trip mounted upon said tube adapted to actuate a valve upon contact with the submarine bottom to permit the delivery of air from said air pipe to said cylinder to cause said piston and knife carried thereby to be operated to cut off said vegetation disposed within said tube, and spring means for retracting said piston and knife into their initial positions.

In testimony whereof I have signed my name to this specification.

ANSEL R. CLARK.